United States Patent [19]

Bharadhwaj

[11] Patent Number: 5,995,999
[45] Date of Patent: Nov. 30, 1999

[54] NAMING SYSTEM FOR HIERARCHICALLY NAMED COMPUTER ACCESSIBLE OBJECTS

[75] Inventor: Rajeev Bharadhwaj, Aurora, Colo.

[73] Assignee: Fujitsu Limited, Japan

[21] Appl. No.: 08/815,748

[22] Filed: Mar. 12, 1997

[51] Int. Cl.[6] ........................................ G06F 13/14
[52] U.S. Cl. .................... 709/200; 709/303; 710/120
[58] Field of Search ............................ 395/200.3, 683, 395/300; 709/200, 303; 710/120

[56] References Cited

U.S. PATENT DOCUMENTS

| | | | |
|---|---|---|---|
| 5,325,524 | 6/1994 | Black et al. ............................ | 395/600 |
| 5,408,619 | 4/1995 | Oran et al. ............................. | 395/325 |
| 5,577,252 | 11/1996 | Nelson et al. ........................ | 395/670 |
| 5,701,484 | 12/1997 | Artsy ..................................... | 395/683 |
| 5,727,145 | 3/1998 | Nessett et al. ......................... | 395/186 |
| 5,822,569 | 10/1998 | McPartlan et al. .................... | 395/500 |
| 5,826,010 | 10/1998 | Joseph et al. ......................... | 395/186 |

FOREIGN PATENT DOCUMENTS 0661652  7/1995  European Pat. Off. ........ G06F 17/30

OTHER PUBLICATIONS

Brent Welch, "A Comparison of Three Distributed File System Architectures: Vnode, Sprite, and Plan 9", Computing Systems, vol. 7, No. 2, Jan. 1, 1994, pp. 175–199, pertinent pp. 180–192.

Brent Welch et al., "Prefix Tables: A Simple Mechanism for Locating Files in a Distributed System," Internat. Conf. on Dist. Comp. Sys., IEEE, May 19–23, 1986, pp. 184–189, pertinent pp. 184–186.

*Primary Examiner*—Zarni Maung
*Assistant Examiner*—Saleh Najjar
*Attorney, Agent, or Firm*—Carr & Ferrell LLP

[57] ABSTRACT

A naming system for resolution of hierarchically named computer accessible objects to respective object identifiers. The naming system includes a global namer module which is instantiated on multiple systems. Resolution of a hierarchical name begins at a first instance of the global namer module. The first instance resolves one or more successive portions of the hierarchical name to a respective object identifier(s). If the hierarchical name cannot be completely resolved at the first instance, the hierarhcial name is forwarded to a second instance which is referenced by an object identifier identified by the first instance. Resolution then continues at the second instance, and possibly at additional instances of the global namer module, until the last portion of the hierarchical name is resolved to an object identifier. The object identifier is then returned as that of the entire hierarchical name.

21 Claims, 12 Drawing Sheets

NAMING SYSTEM FOR HIERARCHICALLY NAMED COMPUTER ACCESSIBLE OBJECTS

CROSS-REFERENCE TO CO-PENDING APPLICATIONS

This application is related to the co-pending patent applications: "A SYSTEM AND METHOD FOR EXECUTION MANAGEMENT OF COMPUTER PROGRAMS" which was filed on Dec. 30, 1996 by Rajeev Bharadhwaj application Ser. No. 08/778,213 which is pending; and "A COMMUNICATIONS SYSTEM FOR CLIENT-SERVER DATA PROCESSING SYSTEMS" which was filed on Mar. 12, 1997 by Rajeev Bharadhwaj application Ser. No. 08/815,742 which is pending, both assigned to the assignee of the present invention, and both of which are hereby incorporated by reference.

BACKGROUND OF THE INVENTION

1. Field of the Invention

The present invention generally relates to client-server type data processing systems, and more particularly to a system for naming objects which are made accessible via server systems.

2. Description of Background Art

Usage of client-server type data processing systems continues to increase. Client-server systems offer flexibility in the distribution of processing tasks between various systems on a network.

Server systems host server programs that provide services to client programs. Oftentimes, the term object is used to refer to services and/or data referenced by a client program. For a client program to gain access to an object, it must know the identity of the server system hosting the server program which provides access to the object, as well as the identifier of the object.

The client program may be programmed to directly reference the object (via the server system identifier and object identifier). However, this means that if the referenced object is moved and thereby hosted by a different server system, the client program must be modified to reference the different server system. If there are many client programs which reference the object, each of the programs would have to be modified. Thus, the seemingly simple act of moving an object to a different server system could actually result in a major effort to update the client programs.

In response to such a problem, the Domain Name Service (DNS) was created. The DNS introduces a level of indirection into the addressing of an object. The service maps a logical name of a service to an Internet Protocol (IP) address, thereby eliminating the requirement for a client program to remember the address. Note that the logical name of a service oftentimes refers to the logical nature of the service or data. Thus, it is desirable for the name to remain relatively static. With DNS, the client program need only remember the logical service name. Thus, the service can be moved to a machine having a different IP address without requiring notification to the clients. Only the DNS needs to be notified of the change.

With the growth of the Internet, distributed naming services have become popular. Systems adhering to distributed naming protocols, e.g., Lightweight Directory Access Protocol (LDAP), offer replication of naming services, thereby distributing the naming services at multiple sites on the Internet. The availability of the naming services at multiple sites offers protection against disaster in addition to relieving processing bottlenecks.

Present naming services are typically implemented under either a multiple-master naming service architecture or a single-master naming service architecture. In both types of architectures a master naming service system is the only system that can effect a change. Both types of architectures can have multiple slave systems, and the slave systems duplicate the changes forwarded from the master systems. In the multiple-master naming service architecture, there are multiple master naming service systems, and a name and address may be added at any one of the master naming service systems. The master system at which a name is added propagates the addition to each of the other master naming service systems and to the slave systems.

In contrast, the single-master naming service architecture has multiple slave naming service systems and a single master naming service system. A name may be added only at the master system, which then propagates the addition to each of the slave naming service systems.

Both the multiple-master naming service architecture and the single-master naming service architecture require a protocol for maintaining consistency. That is, each of the naming service systems must have identical mappings. When a mapping is added to a master naming service system, the mapping must be added to either the other master naming service systems or the slave naming service systems, depending upon the architecture type. With respect to the multiple-master naming service architecture, each of the master naming service systems must be consistent with the others; and in the single-master naming service architecture, the master naming service system must make consistent each of the slave naming service systems. Maintaining consistency between the naming service systems involves extra complexity in implementation and additional overhead processing when names are added and close connections between the master systems and slave systems.

Both the multiple-master naming service architecture and the single-master naming service architecture have multiple replicated databases of the mappings. Thus, the architectures may be viewed as having multiple centralized databases. A drawback to a centralized database is that a bottleneck may develop at the system hosting the database. Thus, even though the replicated databases are distributed throughout a network, the number of client systems assigned to each of the naming service systems must be monitored to provide adequate response time.

Thus it would be desirable to have a naming service which is not a subject to the limitations of multiple-master or single-master type naming service architectures.

SUMMARY OF THE INVENTION

The present invention is a naming system for hierarchically named computer accessible objects. The system provides an economical mechanism for creating new hierarchical names and for resolving hierarchical names of computer objects to unique object identifiers. The invention uses multiple instances of a global namer module for distribution of mappings of portions of hierarchical names to object identifiers. The system resolves an input hierarchical name of an object to an object identifier. To resolve the hierarchical name, each of the instances of the global namer module has mappings of portions of hierarchical object names to object identifiers. When a request is intitiated to, for example, a first instance of the global namer module, the first instance resolves successive portions of the hierarchical name until either the end of the hierarchical name is reached and an object identifier is identified, or a portion of the hierarchical name maps to an object identifier which references a second instance of the global namer module. If a second instance of the global namer module is referenced, the hierarchical name is forwarded to the second instance for continued resolution. The process continues until the last portion of the hierarchical name is resolved to an object identifier, which is the final object identifier. The final object identifier is then returned as the object identifer for the input hierarchical name.

New objects may be economically added to the naming system by adding at a predetermined one of the instances of the global namer module a mapping of the new object, as logicially identified by a portion of a hierarchical name, to its object identifier. The mapping need only be added at one instance of the global namer module. Because other instances of the global namer module do not need to be apprised of the added object, the present invention eliminates the synchronization processing required by prior art master-slave naming service architectures, thereby saving time.

These and other advantages of the invention will become apparent upon review of the drawings and accompanying description set forth below.

DETAILED DESCRIPTION

Figure 1:
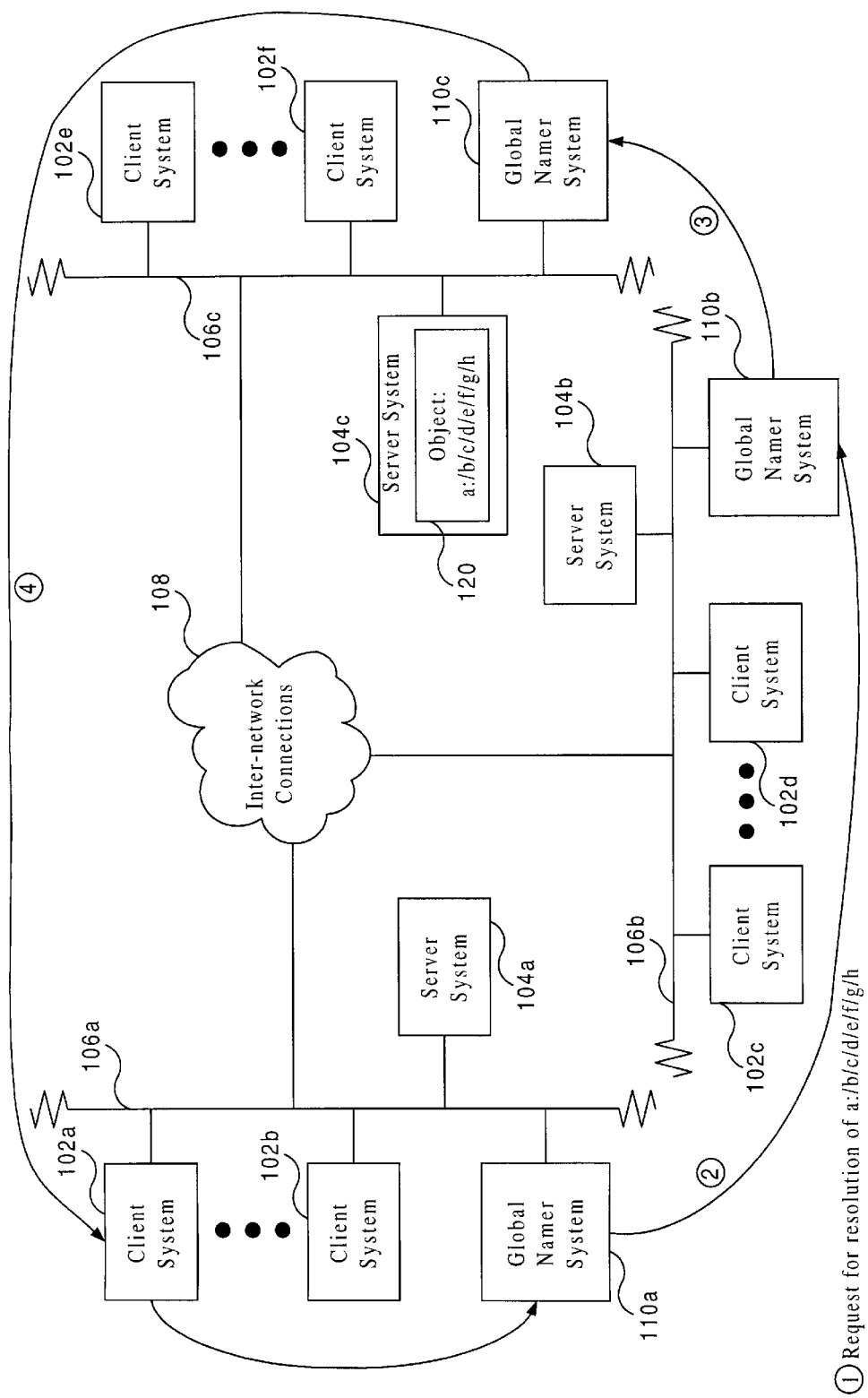
FIG. 1 is a block diagram of inter-networked computer systems in which object identification services are provided by multiple global namer systems.

FIG. 1 is a block diagram of inter-networked computer systems in which object identification services are provided by multiple global namer systems. Client systems 102a–f forward requests for services from client programs (not shown) to various ones of the server systems 104a–c. The client systems 102e–f and server systems 104a–c are respectively coupled to network segments 106a–c, and the network segments are inter-connected as illustrated by the inter-network connections 108.

The global namer systems 110a–c are used by programs which are hosted by the client systems 102a–f. The global namer systems 110a–c host respective instances of a global namer module which collectively resolve references in the form of hierarchical logical names to physical names. The "hierarchical logical names" reference various types of objects which are accessible to the programs. The types of objects may include data files such as Hyper-Text Markup Language files (HTML), server programs such as would be hosted by the server systems 104a–c, and domain arrays, domain array elements, and domain ports as described in the cross-referenced co-pending patent applications. The physical names will hereinafter be referred to as "object identifiers" and will refer to a unique identifier for directly referencing the object referenced by the hierarchical logical name.

An example of the resolution of a hierarchical logical name, a:/b/c/d/e/f/g/h, to its physical name is illustrated in FIG. 1. At step 1, a client program hosted by client system 102a issues a request to global namer system 110a to resolve the name of object a:/b/c/d/e/f/g/h. It is assumed that global namer system 110a is assigned as a root global namer to client system 102a. The root global namer is the first one of global namer systems 110a–c to which a client system 102a–f issues a hierarchical logical name for resolution. The global namer system 110a resolves components a:, /b, and /c of the logical name. The component /c resolves to global namer system 110b, and at step 2, a request is forwarded to global namer system 110b for continued resolution of the remainder of the logical name, i.e., /d/e/f/g/h.

Global namer system 110b receives the entire logical name a:/b/c/d/e/f/g/h and continues resolution at /d. The components /d, /e, and /f are resolved to global namer system 110c by global namer system 110b. At step 3, the logical name is forwarded to global namer system 110c for resolution of /g/h. Global namer system 110c resolves the remainder of the logical name to server system 104c and the block 120 labeled as a:/b/c/d/e/f/g/h. An object identifier is used to identify the server system 104c in combination with block 120. The object identifier may be used by the client program hosted on client system 102a to reference the object a:/b/c/d/e/f/g/h. Global namer system 110c returns the object identifier to client system 102a as shown by line 4.

Figure 2:
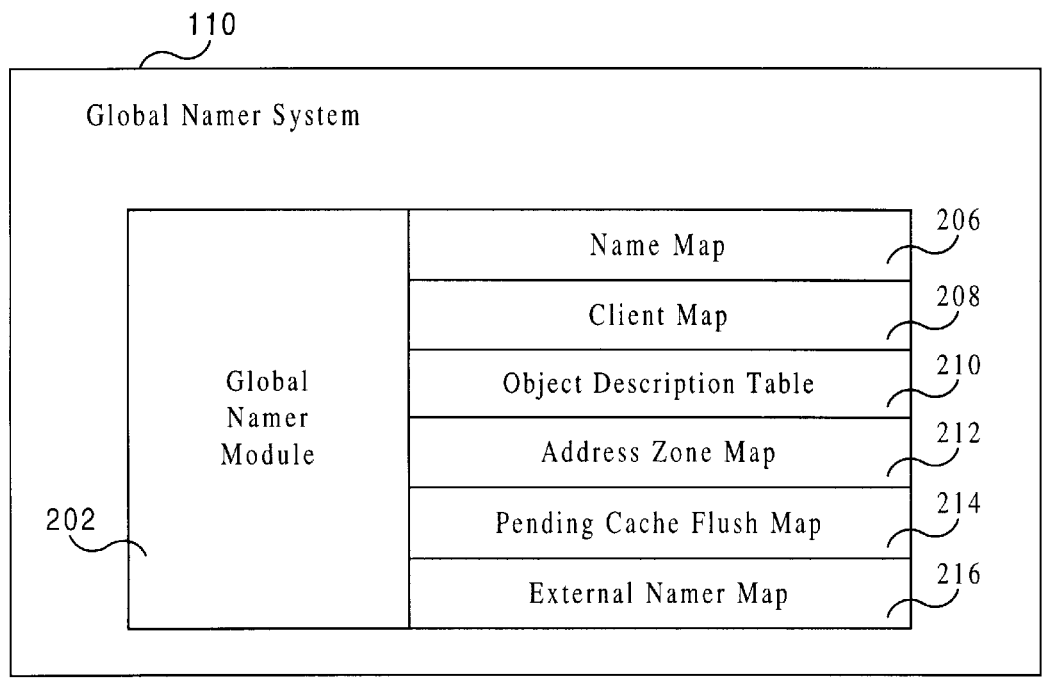
FIG. 2 is a block diagram of a global namer system.

FIG. 2 is a block diagram of a global namer system 110. Global namer systems 110a–c are exemplary ones of global namer 110. Global namer 110 is a conventional data processing system whose hardware resources may be configured according to processing requirements of the system. The global namer module 202 is software which is hosted by the global namer system 110. The global namer module 202 uses the name map 206, client map 208, object description table 210, address zone map 212, pending cache flush map 214, and external namer map 216 to resolve a logical name of an object.

The name map 206 maps an input logical name and access_id, or a portion of an input logical name, to an object identifier.

The client map 208 maps all client objects for a server object. For example in FIG. 1, a client program hosted by client system 102a is mapped to the object a:/b/c/d/e/f/g/h.

The client map 208 is used to identify which client systems 102*a–f* have cached references to objects so that if the address of the object changes, the client systems can be informed to flush their caches.

The object description table 210 describes the type of object identified by an object identifier. As stated above, objects may be data files such as Hyper-Text Markup Language files (HTML), server programs such as would be hosted by the server systems 104*a–c*, and domain arrays, domain array elements, and domain ports as described in the cross-referenced co-pending patent applications.

The address zone map 212 maintains a map of address ranges and node names. The address zone map is used in updating the various maps 206–216 when objects are deleted and renamed.

A list of client systems 102*a–f* where a cache flush is pending is maintained in the pending cache flush map 214. If a client system 102*a–f* does not respond after a global namer system 110*a–c* sends a request to flush the cache, an identifier for the non-responding client system is added to the pending cache flush map 214. When a non-responding client system 102*a–f* once again initiates contact with a global namer system 110, the global namer module 202 checks the pending cache flush map 214 for the client system. If the client system is identified, the global namer module 202 sends a cache flush request to the client system.

The external namer map 216 maintains a list of succeeding nodes encountered in resolving a logical name of an object to its object identifier. Also maintained are an object path list (from the name map 206) for the global namer module 202 and a preceding global namer from which a logical name was forwarded. The external namer map is used in deleting and renaming objects.

Figure 3:
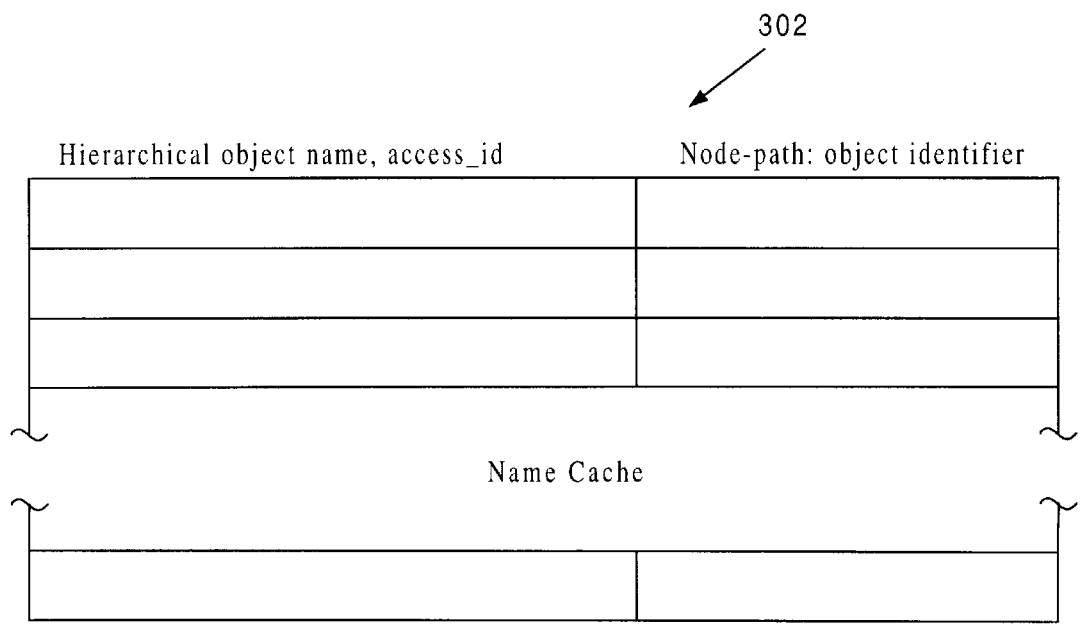
FIG. 3 is a table that illustrates the content of a name cache.

FIG. 3 is a table that illustrates the content of a name cache 302. The name cache 302 is used to map an input hierarchical logical name of an object to an object identifier. Caching object identifiers reduces the need to resolve logical names through multiple global namer systems 110*a–c*. In the example of FIG. 1, client system 102*a* caches the mapping of a:/b/c/d/e/f/g/h to its associated object identifier which is returned from global namer system 110*c*.

Each entry in the left-hand column in the table includes an hierarchical object name and an access_id. The hierarchical object name is a logical name which the global namer module 202 resolved to an object identifier. The access_id is an identifier submitted by a client program making a request for the object having the hierarchical object name.

In the example of FIG. 1, the hierarchical object name is a:/b/c/d/e/f/g/h. The access_id is that of the client program which made the request. For example, the access_id would be of the form client_id:process_id. The corresponding node-path:object identifier would be global namer 110*a*, global namer 110*b*, global namer 110*c*:object identifier, where object identifier is the address of the named object.

Figure 4:
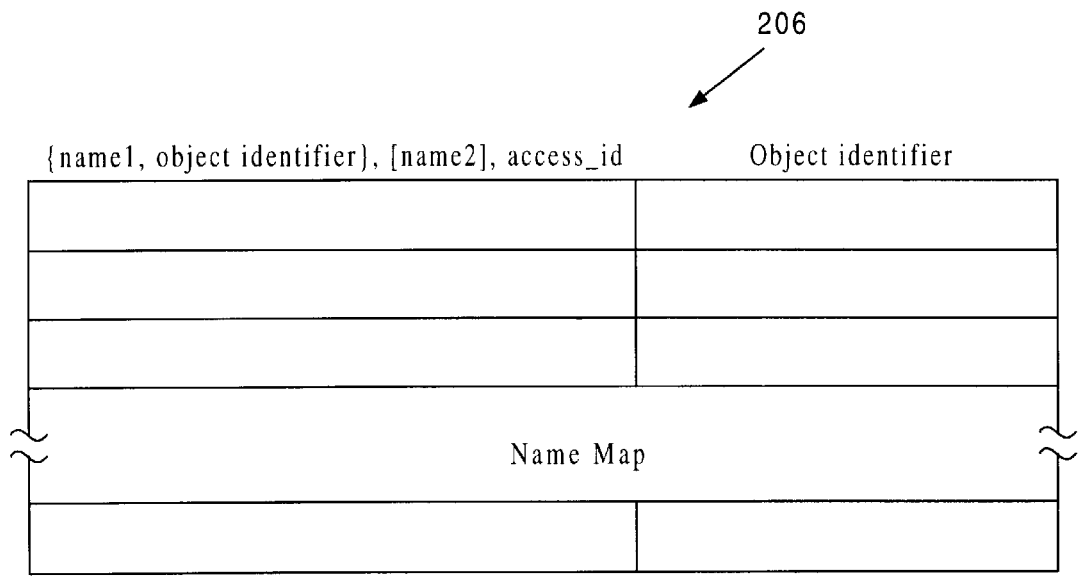
FIG. 4 is a table that illustrates the content of a name map.

FIG. 4 is a table that illustrates the content of name map 206. The name map 206 maps an input logical name and access_id, or a portion of an input logical name, to an object identifier. The name map 206 is used where the input logical name is not present in the name cache 302.

Entries in the left-hand column of the name map 206 are of the form {name1, object identifier}[name2], access_id. The defined syntax indicates that either name1 and an object identifier, or name1 alone, or an object identifier alone is required, and additional names may optionally follow, designated as name2. The access_id is a required second part of the entry. If the access_id is 0, then it is assumed to be a wild card for all objects with the name portion.

A name is assumed to be hierarchical and without loops. That is, the name is assumed to be a directed acyclic graph. A name can have multiple components where a component may be any one of the following object types: data files, domain array, domain group, or a domain port. Components of a name are separated by a character in the set, {, % / }.

There are three variations in mapping a name using the name map 206. A name in the name map 206 can be mapped to another name for a particular access_id. A name-to-name mapping may return a new access_id. A subcomponent of a name can be a system call, domain array, domain group, or a domain port, and for these types an operation must be performed to obtain a new name and access_id pair. The last variation may be used for authentication of access_ids. Those skilled in the art will recognize that the name map 206 could be structured in alternate ways to achieve the same basic objective.

Figure 5:
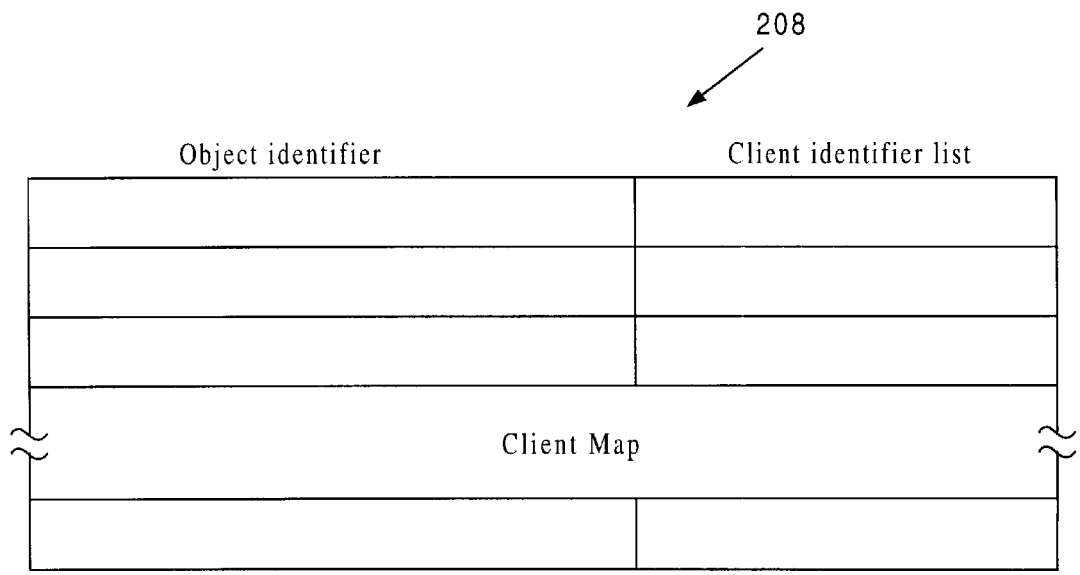
FIG. 5 is a table that illustrates the content of a client map.

FIG. 5 is a table that illustrates the content of client map 208. The client map 208 maps all client objects for a server object where access to the object is provided by the global namer system. For example in FIG. 1, a client program hosted by client system 102*a* is mapped to the object a:/b/c/d/e/f/g/h, if hypothetically, the global namer system 110*c* provides access to the object 120 instead of server system 104*c*. The client map 208 is used to identify which client systems 102*a–f* have cached references to objects so that if the address of the object changes, the client systems can be informed to flush their caches.

Each entry in the left-hand column of the client map 208 contains an object identifier which has been referenced by a client program hosted by a client system 102*a–f*. Each corresponding entry in the right-hand column contains a client identifier list. The client identifier list is a list of client system:process_id pairs, each identifying a client system 102*a–f* and a client program hosted thereon.

Figure 6:
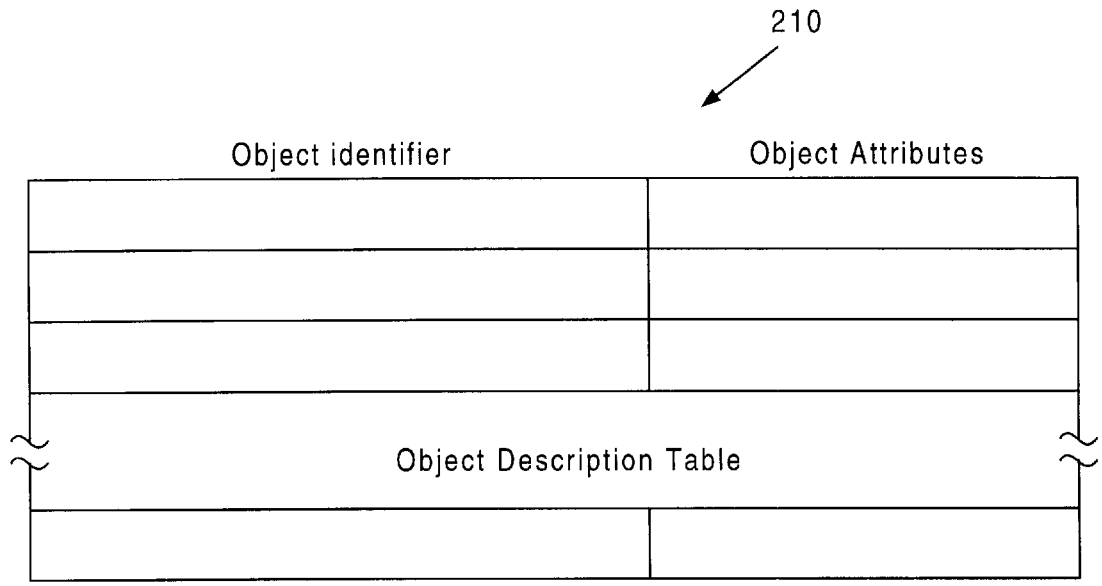
FIG. 6 is a table that illustrates the content of an object description table.

FIG. 6 is a table that illustrates the content of object description table 210. The object description table 210 describes the type of object identified by an object identifier. As stated above, an object may be data files such as Hyper-Text Markup Language files (HTML), server programs such as would be hosted by the server systems 104*a–c*, and domain arrays, domain array elements, and domain ports as described in the cross-referenced co-pending patent applications.

Figure 7:
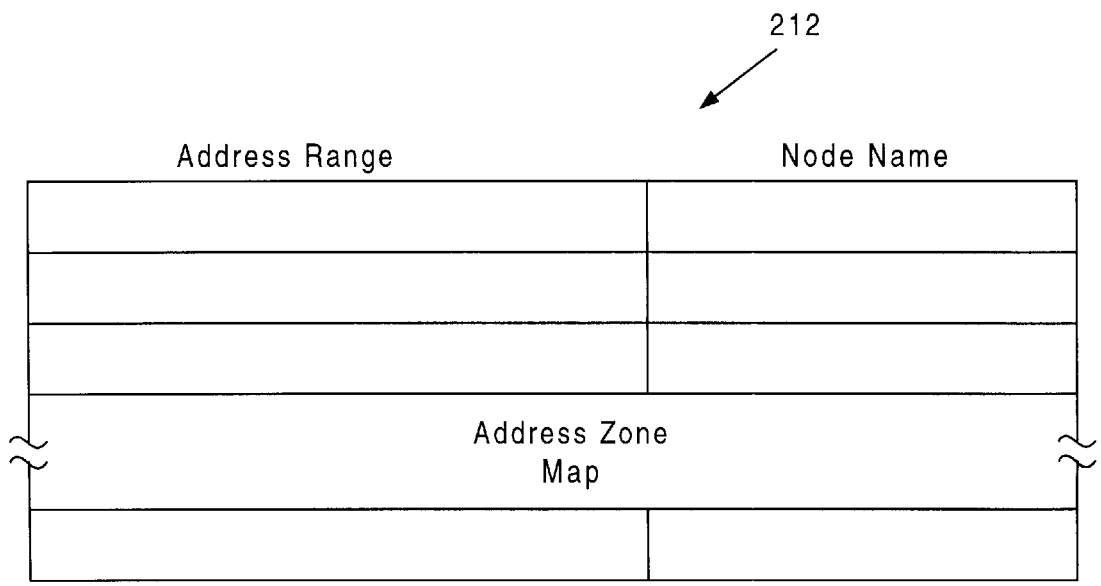
FIG. 7 is a table that illustrates an address zone map.

FIG. 7 is a table that illustrates address zone map 212. The address zone map 212 maintains a map of address ranges to node names. Because the object identifiers may be represented as addresses, the address zone map 212 may be used to quickly identify the node on which a object may be referenced given an object identifier.

Figure 8:
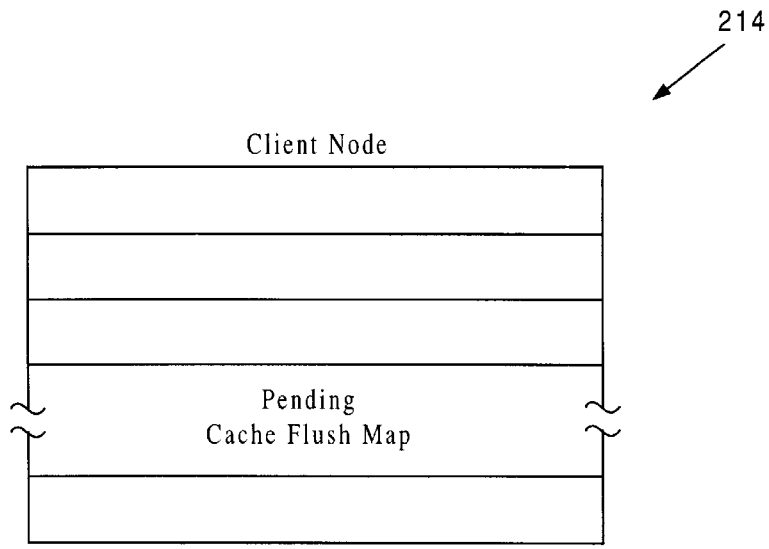
FIG. 8 is a table that illustrates a pending cache flush map.

FIG. 8 is a table that illustrates pending cache flush map 214. A list of client systems 102*a–f* where a cache flush is pending is maintained in the pending cache flush map 214. If a client system 102*a–f* does not respond after a global namer system 110*a–c* sends a request to flush the cache, the non-responding client system is added to the pending cache flush map 214.

Figure 9:
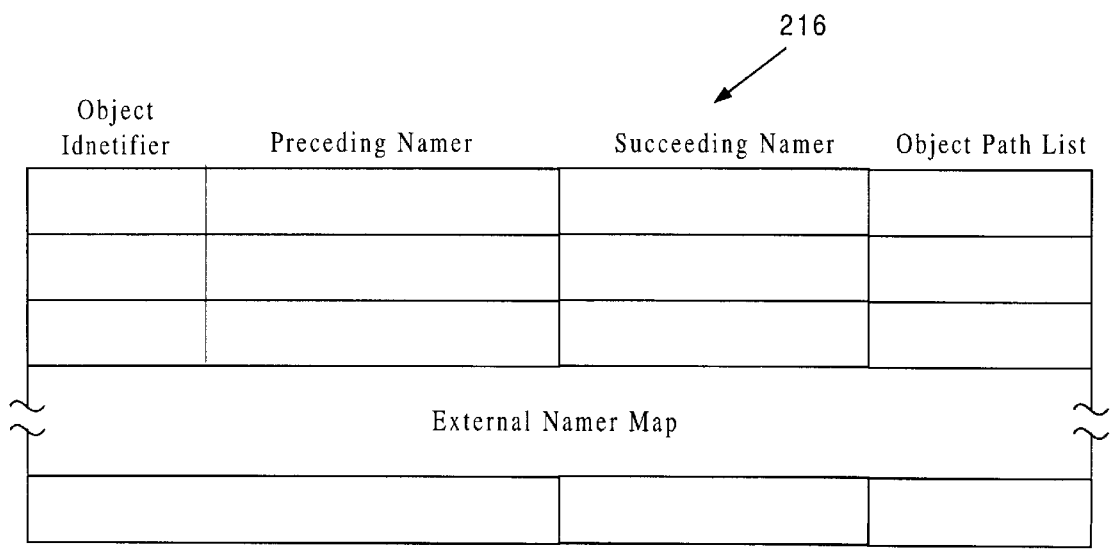
FIG. 9 is a table that illustrates an external namer map.

FIG. 9 is a table that illustrates external namer map 216. The external namer map 216 maintains a list of succeeding nodes encountered in resolving a logical name of an object to its object identifier. Also maintained are an object path list (from the name map 206) for the global namer module 202 and a preceding global namer from which a logical name was forwarded. The external namer map is used in deleting and renaming objects.

Each entry in the Object identifier column of the external namer map 216 contains an object identifier. A corresponding entry in the Preceding Namer column indicates the identification of the global namer system 110a–c from which a request to resolve a logical name was forwarded. A corresponding entry in the Succeeding Namer indicates which global namer system 110a–c a request to resolve a logical name was forwarded for resolution. The final entry associated with an object identifier is an object path list entry. An object path list entry contains a list of pairs of name/object identifier where the list indicates the object identifiers to which names were resolved in the global namer module 202.

Figure 10:
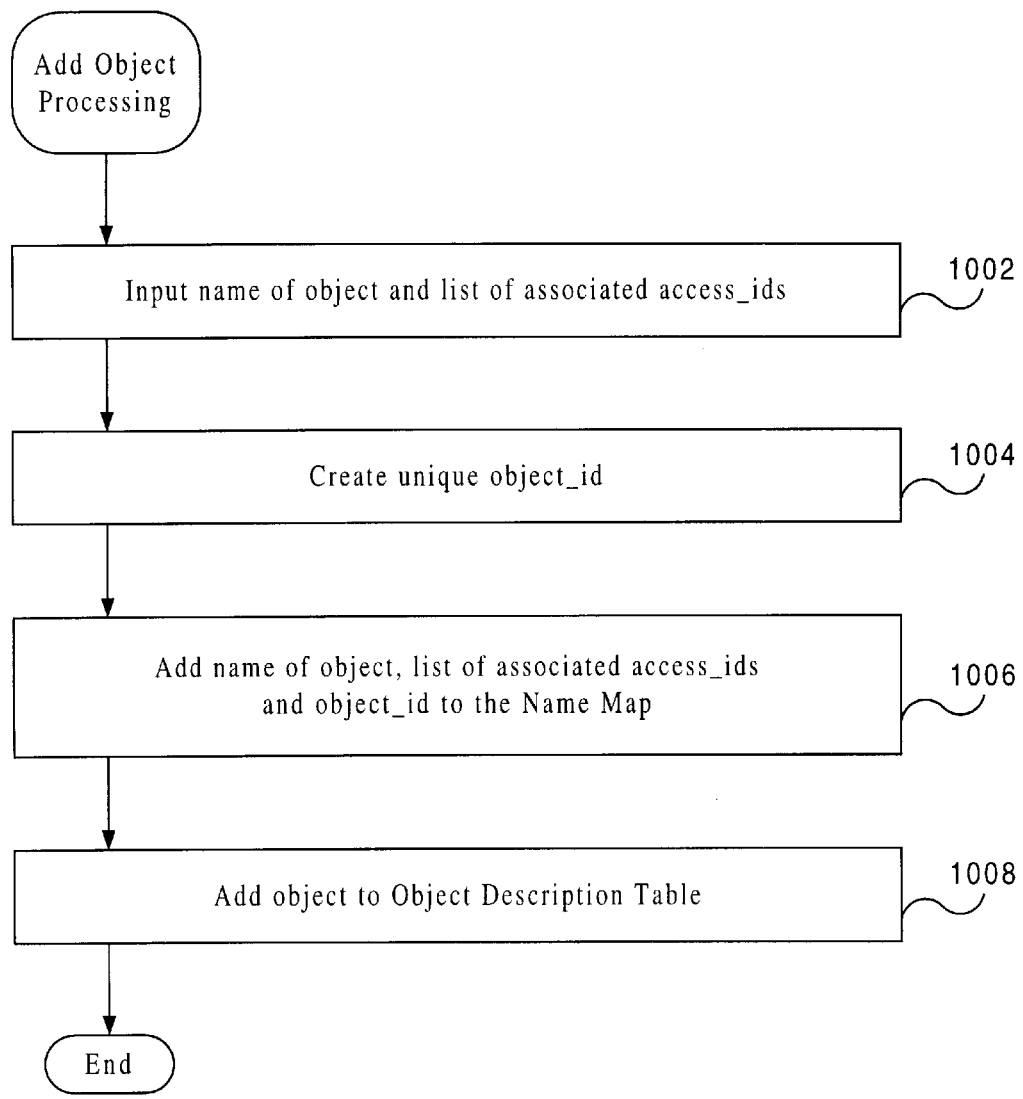
FIG. 10 is a flowchart of the processing performed in adding an object to a global namer module.

FIG. 10 is a flowchart of the processing performed in adding an object to a global namer module 202. The global namer module 202 receives as input a name of an object and a list of associated access_ids at step 1002. The access_ids indicate which programs have access to the object. At step 1004, a unique object identifier is created to address the object. The object identifier is used to address and uniquely identify the named object. The object identifier is unique as between the nodes in the address zone map 212 because there is no overlap in the address ranges in the address zone map.

The name of the object, access_ids, and associated object identifier are added to the name map 206 at step 1006. At step 1008, the object is added to the object descriptor table 210.

Figure 11:
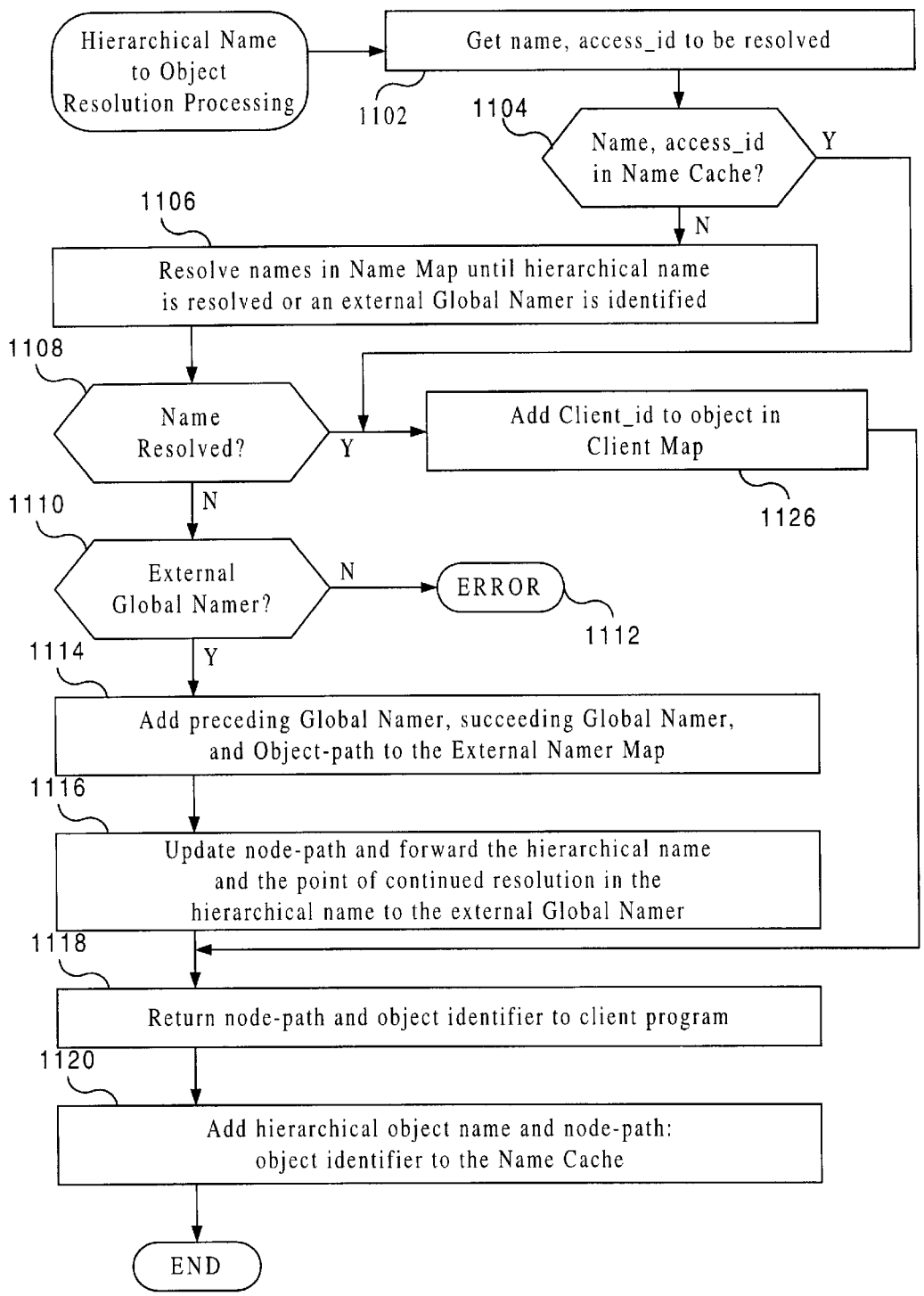
FIG. 11 is a flowchart of the processing for resolving an input hierarchical name to an object identifier.

FIG. 11 is a flowchart of the processing for resolving an input hierarchical name to an object identifier. When a non-responding client system 102a–f once again initiates contact with a global namer system 110, the global namer module 202 checks the pending cache flush map 214 for the client system. If the client system is identified, the global namer module 202 sends a cache flush request to the client system. At step 1102, a hierarchical name and an access_id to be resolved are received as input. The client system, e.g., 102a–f, first looks for the paired "hierarchical name, access_id" in the name cache 302. If the pair is not present in the name cache 302, decision step 1104 directs control to step 1106. Step 1106 successively resolves names within the hierarchical name from left-to-right until the entire hierarchical name is resolved or an external global namer system 110a–c is identified. Decision step 1108 tests whether the hierarchical name was resolved to an object identifier. If not, control is directed to decision step 1110. Decision step 1110 tests whether part of the hierarchical name resolved to an external global namer system 110a–c. If not, control is directed to step 1112 to address an error condition. Otherwise, control is directed to step 1114.

When part of a hierarchical name resolves to an external global namer system 110a–c, step 1114 updates the external namer map 216. Step 1114 adds the identifier of the global namer system 110a–c which forwarded the hierarchical name for resolution to the external namer map 216, if the global namer module 202 is not the root global namer module. Note that the root global namer module 202 is the global namer module which was the global namer module to which the request for resolution was initiated. Global namer modules 202 other than the root global namer module are referred to as external global namers. Step 1114 also adds an identifier for the external global namer to which the hierarchical name resolved in the external namer map 216. The object identifier is also added to the external namer map 216.

At step 1116, the global namer module 202 updates a node-path. The node-path contains a list of the global namer systems 110a–c which were visited in resolving a hierarchical name. The hierarchical name and the position in the hierarchical name at which the succeeding global namer is to begin resolution are then forwarded to the succeeding global namer. Succeeding global namers then perform the processing set forth in FIG. 11 and the global namer module waits for resolution from the succeeding global namer(s).

After step 1116, the succeeding global namer returns an object identifier. At step 1118, the node-path and object identifier are then returned to the client program hosted by the client system 102a–f from which the request was initiated. The node-path is returned to the client system 102a–f, and the node-path is used by the client system in flushing entries from its name cache 302. Without the node-path, an incorrect entry could be removed from the name cache 302 in flushing entries. The name cache 302 at the client system 102a–f is updated at step 1120. Specifically, the hierarchical name of the object and the corresponding node-path:object identifier are added to the name cache 302. Thereafter, processing is complete.

Returning now to decision step 1108, when a global namer module 202 resolves a hierarchical name to an object identifier, control is directed to step 1126. Step 1126 adds the client_id of the client program which initiated the request to the client identifier list of the appropriate object in the client map 208. Control is then directed to step 1118, and processing continues as described above.

Returning now to decision step 1104, if the input name, access_id are present in the name cache 302, control is directed to step 1126, and processing continues as described above.

Figure 12A:
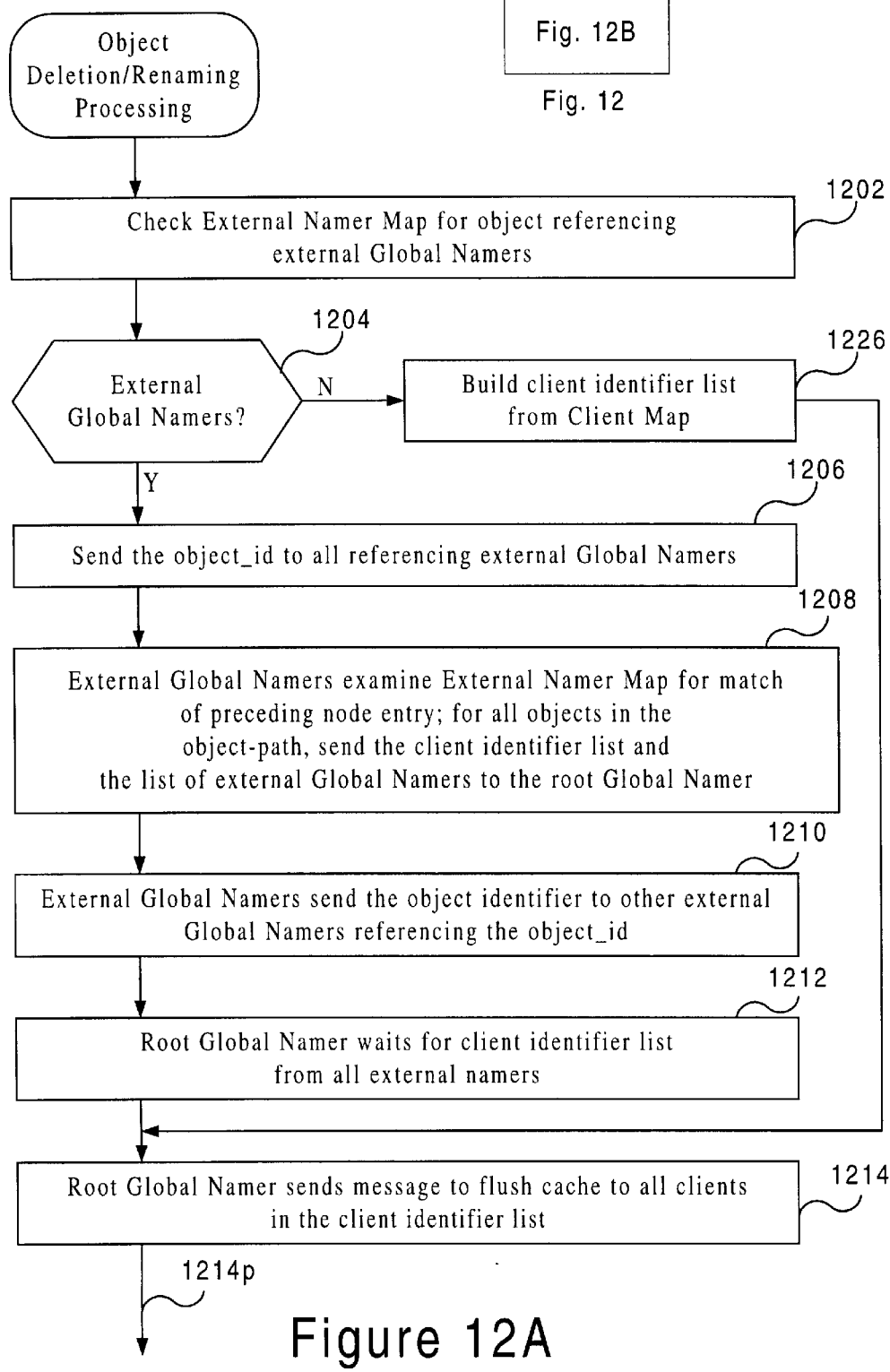
FIG. 12 shows the relationship between FIGS. 12A and 12B, the combination of which contains a flowchart of the processing for deleting or renaming an object within a global namer module.
Figure 12B:
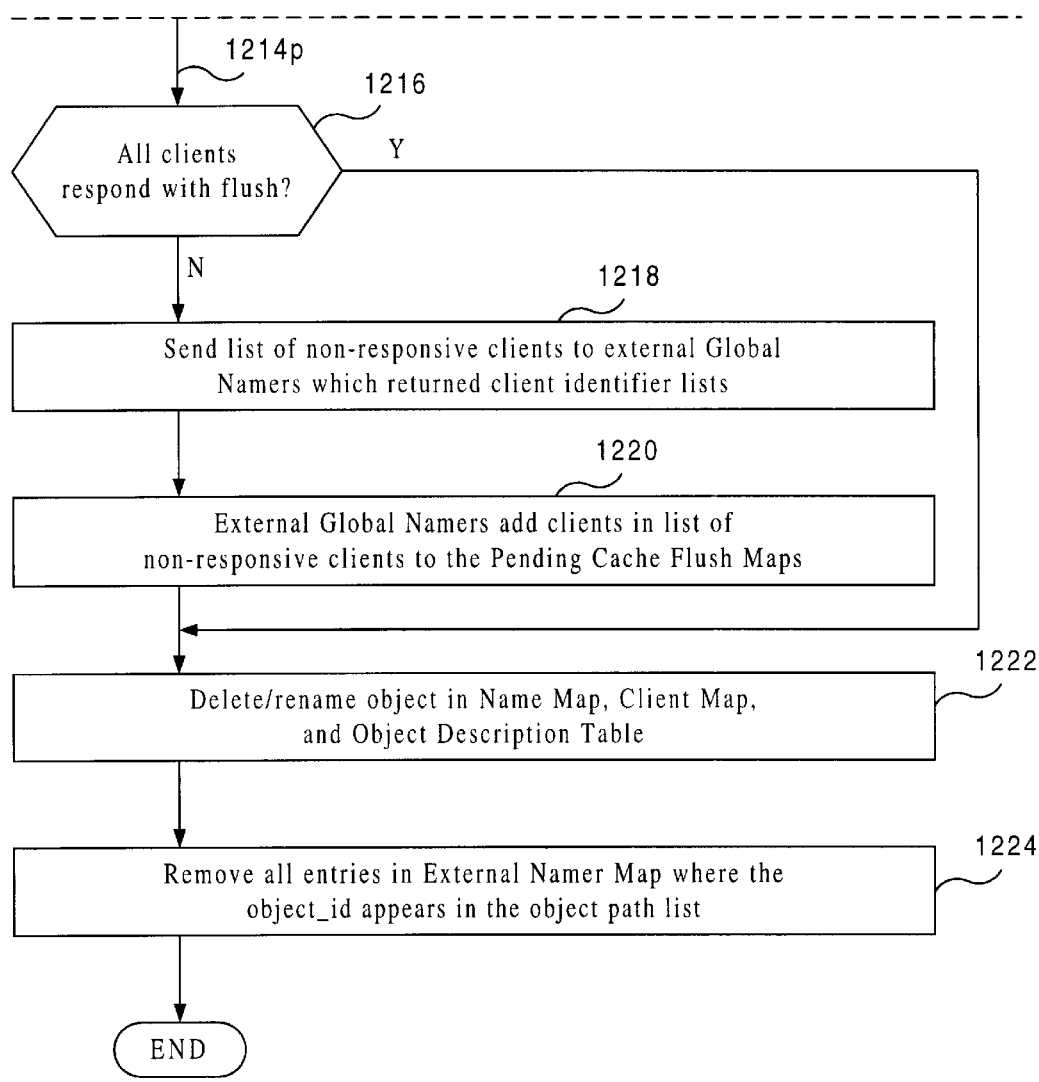

FIG. 12 shows the relationship between FIGS. 12A and 12B, the combination of which contains a flowchart of the processing for deleting or renaming an object within a global namer module 202. Deletion or renaming is selected based upon a selected function input to the global namer. The global namer module 202 at which deletion or renaming processing is initiated is referenced as the root global namer. At step 1202, the root global namer module 202 checks the external namer map 216 for global namers in the succeeding namer entries which correspond to the input object identifier. If there are external global namers, decision step 1204 directs control to step 1206. Step 1206 sends the input object identifier to the external global namers identified in step 1202.

In receiving an input object identifier, at step 1208 an external global namer searches its external namer map 216 for entries in which the preceding node matches that from which the request was made. For those identified entries, all objects in the object-path of the entry have their associated client identifier lists (from the client map 208) and lists of external global namers (from associated succeeding namers of the external namer map 216) sent to the root global namer. At step 1210, the external global namer sends the object identifier to other external global namers referencing the object identifier (as described in steps 1202–1206). The root global namer, at step 1212, waits for client identifier lists from all external global namers.

At step 1214, the root global namer module sends messages to all client systems 102a–f which are identified in the client identifier lists returned from the external global namers. The messages indicate which of the client systems 102a–f should flush their respective name caches 302. Control is then directed via path 1214p to step 1216.

After a predetermined period of time, decision step 1216 tests whether all client systems identified in step 1214 have responded to the request to flush their respective caches. If not, control is directed to step 1218 where a list of non-responsive client systems 102a–f is sent to each of the external global namers which returned a client identifier list. At step 1220, each of the external global namers adds to the pending cache flush map 214 identifiers for each of the non-responsive client systems from step 1218.

The root global namer, at step 1222, deletes or renames the object identifier in each of name map 206, client map 208, and object description table 210. At step 1224, the root global namer deletes all entries in the external namer map 216 where the object identifier appears in the object path list for the deleted or renamed object identifier.

Returning now to decision step 1216, if all client systems 102a–f respond affirmatively that their name caches 302 have been flushed, control is directed to step 1222 and processing continues as described above.

In decision step 1204, if there are no external global namers identified as succeeding namers in the external namer map 216, control is directed to step 1226. A client identifier list is built from the client map 208 at step 1226. Processing then continues at step 1214 as described above.

FIGS. 13A–C–FIG. 16 are illustrative of name maps 206a–c, external namer maps 216a–b, a client map 208a, and a name cache 302a which result from the example described in FIG. 1. Recall that client system 102a requests resolution of a:/b/c/d/e/f/g/h by global namer system 110a.

Figure 13A:
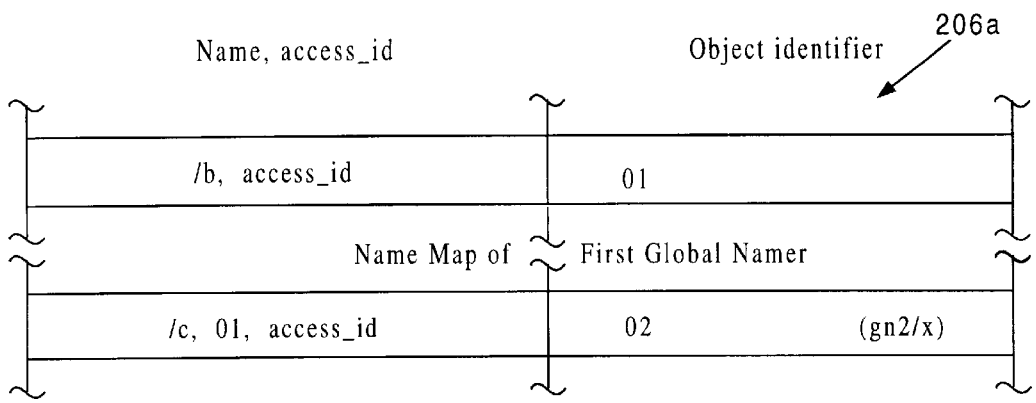
FIGS. 13A–C illustrate the respective name maps of the global namer systems for the example described in FIG. 1.
Figure 13B:
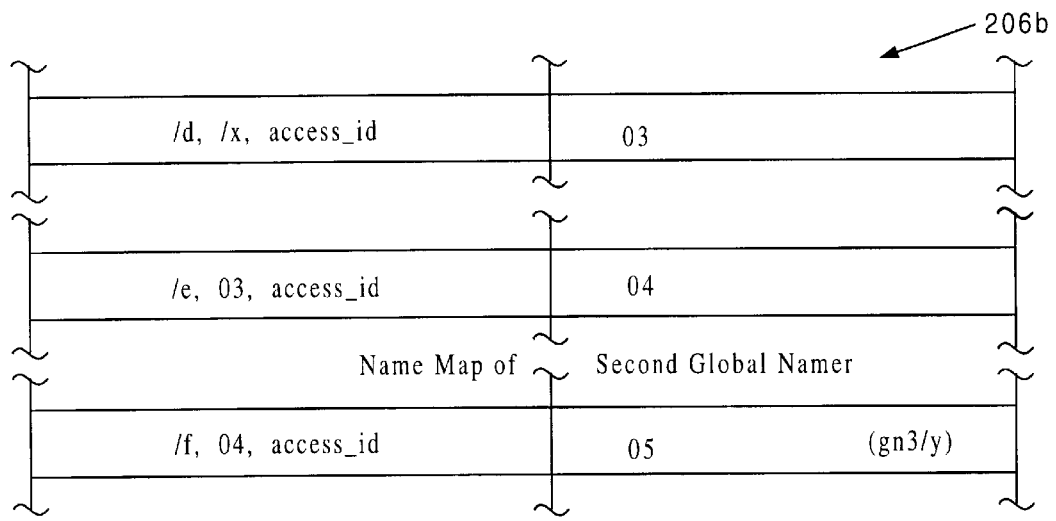
Figure 13C:
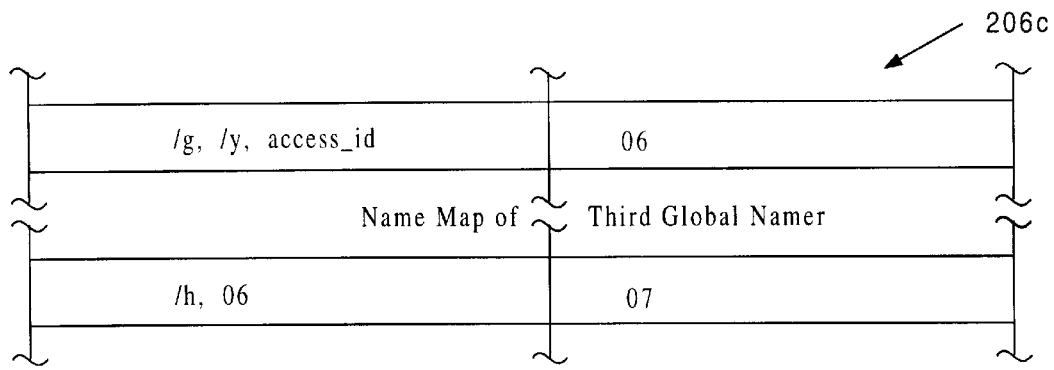

FIG. 13A illustrates the name map 206a of global namer system 110a, FIG. 13B illustrates the name map 206b of global namer system 110b, and FIG. 13C illustrates the name map 206c of global namer system 110c. The entries in the left-hand column consist of name, access_id pairs, as described in FIG. 4, and the entries in the right-hand column consist of corresponding object identifiers. Note that no exemplary values are shown for the various access_ids.

The names /b and /c are resolved in name map 206a of global namer system 110a. The name /b resolves to the object id O1, and the paired name, object identifier /c, O1 maps to O2. Note that O2 maps to global namer system 110b, designated as (gn2/x). Because O2 maps to global namer system 110b, global namer system 110a forwards the hierarchical name a:/b/c/d/e/f/g/h along with the point of continued resolution to global namer system 110b. Note that global namer system 110b continues resolution at /d, and /x is also forwarded to identify the proper name, object identifier pair.

The name map 206b of FIG. 13B illustrates the resolution of the hierarchical name which is accomplished by the global namer system 110b. The names /d, /e, and /f are resolved by the global namer system 110b. The name /d,/x resolves to object O3, the pair /e,O3 resolves to object O4, and the pair /f,O4 resolves to object O5, which is a reference to external global namer system 110b, i.e., (gn3/y).

The name map 206c of FIG. 13C illustrates the resolution of the hierarchical name which is accomplished by the global namer system 110c. The names /g and /h are resolved by the global namer system 110c. The pair /g,/y resolves to object O6, and the pair /h,O6 resolves to object O7, which is the object identifier to which the hierarchical name a:/b/c/d/e/f/g/h is finally resolved.

Figure 14A:
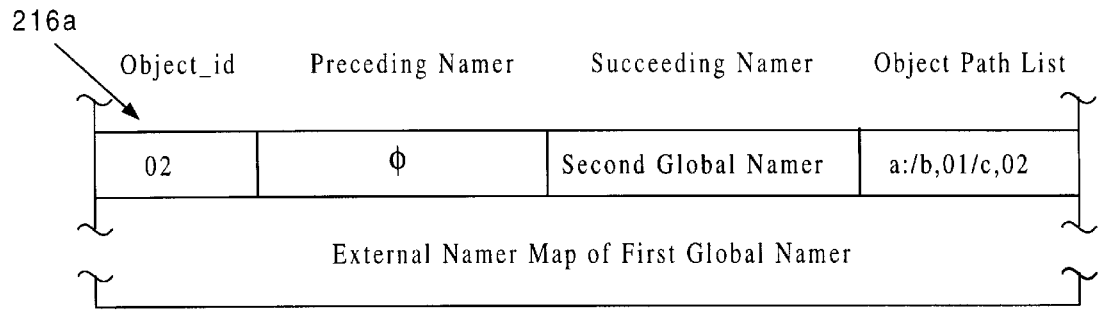
FIGS. 14A–B illustrate respective external namer maps of the global namer systems for the example described along with FIG. 1.
Figure 14B:
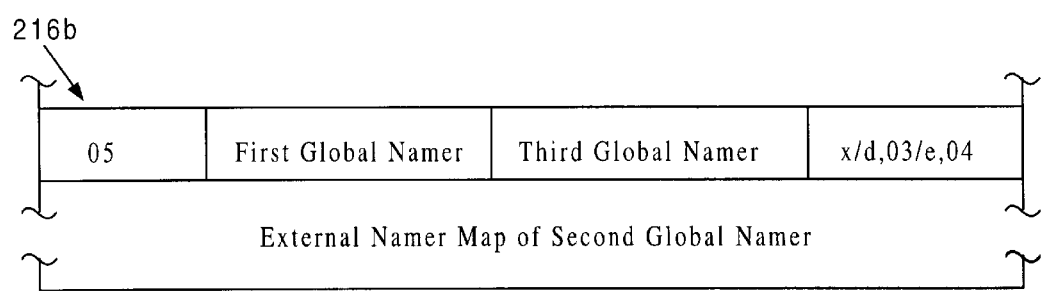

FIG. 14A illustrates the external namer map 216a of global namer system 110a, and FIG. 14B illustrates the external namer map 216b of global namer system 110b for the example described along with FIG. 1. The external namer map 216a of the first global namer system 110a contains an entry for the object O2. Because the first global namer system 110a is the root global namer system for the request to resolve a:/b/c/d/e/f/g/h, the preceding namer entry for the object O2 is null. The succeeding namer identifies the second global namer system 110b because a:/b/c resolved to object O2, and object O2 references the second global namer system 110b. The object path list contains a list of the names within the input hierarchical name and the objects to which the names were resolved in the first global namer system 110a. The object path list of external namer map 216a contains a:/b,O1/c,O2.

The external namer map 216b of the second global namer system 110b contains an entry for the object O5 Because the second global namer system 110b received a request for continued resolution from the first global namer system 110a, the preceding namer entry for the object O2 references the first global namer system 110a. The succeeding namer identifies the third global namer system 110c because a:/b/c/d/e/f resolved to object O5, and object O5 references the third global namer system 110c. The object path list contains a list of the names within the input hierarchical name and the objects to which the names were resolved. The object path list of external namer map 216b contains x/d,O3/e,O4.

Figure 15:
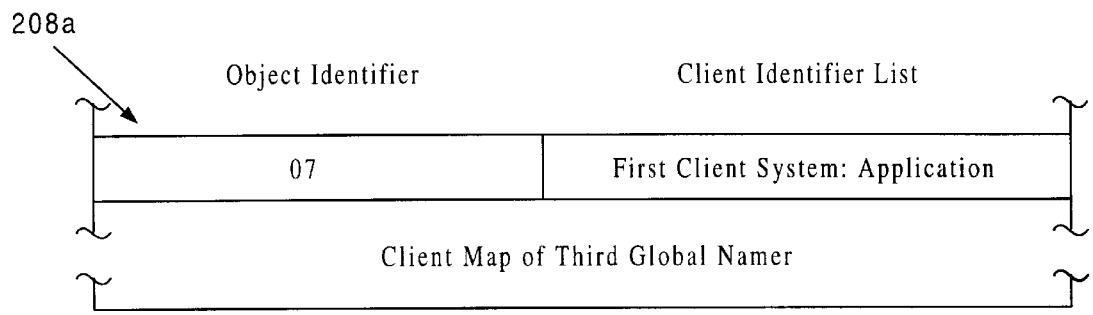
FIG. 15 illustrates a client map of a global namer system in an example which is a modified version of the example of FIG. 1.

FIG. 15 illustrates a client map 208a of global namer system 110c for the example described in FIG. 1, where the example is modified such that global namer system 110c provides access to the object O7 instead of server system 104c. The final resolution of the hierarchical name a:/b/c/d/e/f/g/h is to object O7. Because the request for resolution of the hierarchical name was initiated from a client program hosted by client system 102a, that client program and client system 102a are identified in the client identifier list. Thus, if for example, object O7 is moved from global namer system 110c to server system 104a, the client system 102a can be informed to flush its cache so that client system 102a does not have a cached reference to object O7 on global namer system 110c.

Figure 16:
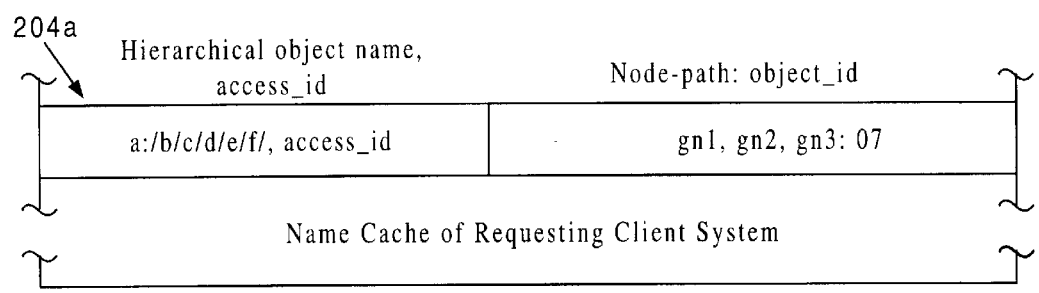
FIG. 16 illustrates a name cache of the client system for the example described in FIG. 1.

FIG. 16 illustrates a name cache 302a of the client system 102a for the example described in FIG. 1. Recall that a name 302 maps a paired hierarchical name and access_id to a node-path:object identifier. In the example of FIG. 1, the hierarchical name a:/b/c/d/e/f/g/h and access_id were resolved through global namer systems 110a, 110b, and 110c to object O7. Thus, the paired node-path:object identifier is gn1,gn2,gn3:O7.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for resolving a hierarchical object name to an object identifier, said name being received from an originating client system which is associated with an originating name cache and is running an originating client program, said method comprising the steps of:

resolving the hierarchical object name to the object identifier at a global namer in a chain of global namers including a root global namer;

returning the object identifier and a node-path containing a list of global namers which were visited in resolving the hierarchical object name, to the originating client program; and adding the hierarchical object name, the node-path, and the object identifier to the originating name cache.

2. The method of claim 1 further comprising the step of using the hierarchical object name and a list of associated access identifiers for looking-up in the originating name cache.

3. The method of claim 2 wherein the step of resolving at a root global namer comprises the further step of adding a client identifier to a client map associated with the root global namer.

4. The method of claim 3 wherein in the step of resolving if the object identifier is at a global namer which is not a root global namer, then the step of resolving further comprises the steps of:
- identifying a preceding global namer which forwarded the hierarchical object name to a current global namer, which is resolving the hierarchical name, and to a succeeding global namer which will receive the hierarchical object name from the current global namer;
- adding the preceding global namer, the succeeding global namer, and an object path to an external namer map (NAMER MAP S) associated with the current global namer;
- forwarding the hierarchical object name and the point of continued resolution in the hierarchical object name to the succeeding global namer; and
- updating the node-path.

5. The method of claim 4 comprising the further step of a global namer (NAMER X), upon receiving a contact from a client system, requesting the client system to flush its cache if the client system is identified in a pending cache flush map (CACHE FLUSH MAP X) associated with the NAMER X.

6. The method of claim 5 further comprising the steps of:
- the client system flushing its cache; and
- the NAMER X deleting an entry associated with the client system from the CACHE FLUSH MAP X.

7. A method for adding an object (OBJECT A) to a global namer (NAMER A), comprising the steps of:
- maintaining a pending cache flush map;
- receiving an object name and a list of associated access identifiers indicating programs having access to the OBJECT A;
- creating an object identifier for identifying the OBJECT A; and
- adding the object name, the list of associated access identifiers, and the object identifier to a name map associated with the NAMER A.

8. The method of claim 7 comprising the further step of adding the object to an object description table associated with the NAMER A.

9. The method of claim 8 comprising the further step of a global namer (NAMER X), upon receiving a contact from a client system, requesting the client system to flush its cache if the client system is identified in a pending cache flush map (CACHE FLUSH MAP X) associated with the NAMER X.

10. The method of claim 9 further comprising the steps of:
- the client system flushing its cache; and
- the NAMER X deleting an entry associated with the client system from the CACHE FLUSH MAP X.

11. A method for updating an object corresponding to an object identifier in a root global namer (NAMER ROOT U) associated with a root external namer map, a root client map, a root name map, and a root object description table, comprising the steps of:
- checking the root external namer map for one or more succeeding external global namers (NAMERS U) corresponding to the root object identifier;
- if no NAMER U is identified in the root external namer map then building a list of client identifiers (LIST U) from the root client map;
- flushing respective caches associated with client systems identified in the LIST U;
- updating the object in the root client map, in the root name map, and in the root object description table; and
- deleting all entries in the external namer map where the object identifier appears in an updating object path list.

12. The method of claim 11 comprising the further step of building the LIST U from at least one NAMER U if the at least one NAMER U is identified in the root external namer map.

13. The method of claim 12 comprising the further step of sending a list of non-responding systems to a NAMER U which returns client identifiers.

14. The method of claim 13 further comprising the step of a global namer (NAMER X) maintaining in a pending cache flush map (CACHE FLUSH MAP X) a list of client systems having a pending cache flush.

15. The method of claim 14 comprising the further step of the NAMER X, upon receiving a contact from a client system, requesting the client system to flush its cache if the client system is identified in the CACHE FLUSH MAP X.

16. The method of claim 15 further comprising the steps of:
- the client system flushing its cache; and
- the NAMER X deleting an entry associated with the client system in the CACHE FLUSH MAP X.

17. The method of claim 15 comprising the further step of, in response to a non-responding system, adding an entry associated with the non-responding system to the CACHE FLUSH MAP X.

18. The method of claim 17 wherein the step of updating is selected from a group consisting of deleting and renaming the object.

19. The method of claim 18 comprising the further step of sending the object identifier to the at least one NAMER U.

20. The method of claim 19 further comprising the steps of:
- an external global namer (NAMER U1) of the at least one NAMER U searching its external namer map for entries in which preceding external namers match the object identifier;
- each object in an object-path corresponding to the matched entries sending its list of client identifiers and list of external global namers to the NAMER ROOT U;
- the NAMER U1 sending the object identifier to external global namers referencing the object identifier; and
- the external global namers sending their client identifier lists to the NAMER ROOT U.

21. A computer-readable medium comprising program instructions for causing a computer to resolve a hierarchical object name to an object identifier, said name being received from an originating client system which is associated with an originating name cache and is running an originating client program, by performing the steps of:
- resolving the hierarchical object name to the object identifier at a global namer in a chain of global namers including a root global namer;
- returning the object identifier and a node-path containing a list of global namers which were visited in resolving the hierarchical object name, to the originating client program; and
- adding the hierarchical object name, the node-path, and the object identifier to the originating name cache.

* * * * *